United States Patent
Newman et al.

(10) Patent No.: US 10,255,680 B2
(45) Date of Patent: Apr. 9, 2019

(54) VEHICLE LOCALIZATION

(71) Applicant: OXFORD UNIVERSITY INNOVATION LIMITED, Botley, Oxford (GB)

(72) Inventors: Paul Newman, Botley (GB); William Maddern, Botley (GB); Alexander Douglas Stewart, Botley (GB); Winston Churchill, Botley (GB); Colin McManus, Botley (GB)

(73) Assignee: Oxford University Innovation Limited, Oxford (GB)

( * ) Notice: Subject to any disclaimer, the term of this patent is extended or adjusted under 35 U.S.C. 154(b) by 0 days.

(21) Appl. No.: 15/312,430

(22) PCT Filed: May 29, 2015

(86) PCT No.: PCT/GB2015/051566
§ 371 (c)(1),
(2) Date: Nov. 18, 2016

(87) PCT Pub. No.: WO2015/181561
PCT Pub. Date: Dec. 3, 2015

(65) Prior Publication Data
US 2017/0076455 A1    Mar. 16, 2017

(30) Foreign Application Priority Data
May 30, 2014   (GB) .................................. 1409625.9

(51) Int. Cl.
*G06T 7/73*   (2017.01)
*G06T 7/00*   (2017.01)

(52) U.S. Cl.
CPC .............. *G06T 7/0044* (2013.01); *G06T 7/74* (2017.01); *G06T 2207/10004* (2013.01);
(Continued)

(58) Field of Classification Search
CPC ..................... G06T 7/0044; G06T 7/74; G06T 2207/10004; G06T 2207/10021;
(Continued)

(56) References Cited

U.S. PATENT DOCUMENTS 9,336,436 B1 * 5/2016 Dowdall ................. G08G 1/166
9,864,927 B2   1/2018 McManus et al.
(Continued)

FOREIGN PATENT DOCUMENTS

CN   1751249        3/2006
CN   101488185 A *  7/2009  ......... G06K 9/00348
(Continued)

OTHER PUBLICATIONS

Behle, "Binary Decision Diagrams and Integer Programming", Doctoral Thesis, Universitat des Saarlandes, 2007, pp. 1-98.
(Continued)

*Primary Examiner* — Mekonen T Bekele
(74) *Attorney, Agent, or Firm* — Knobbe, Martens, Olson & Bear, LLP

(57) ABSTRACT

A method of localizing a transportable apparatus (102) within an environment around the apparatus is disclosed. The method comprises obtaining a sequence of images (200) of the environment and generating one or more sequences of transformed images (204) from the sequence of images wherein an image from the sequence of images has undergone a transformation to provide a transformed image within the sequence of transformed images. Processing circuitry (112) is then used to compare one or more images from the sequence of transformed images (204) and one or more images from at least one of the sequence of images (200) and a further sequence of transformed images against a representation of the environment. The comparison determines corresponding features within the images (200) and/or trans-
(Continued)

formed images (204) and the representation. The transportable apparatus (102) is then localized according to a position of the one or more corresponding features.

19 Claims, 9 Drawing Sheets

(52) U.S. Cl.
CPC ............... *G06T 2207/10021* (2013.01); *G06T 2207/10048* (2013.01); *G06T 2207/20081* (2013.01); *G06T 2207/30244* (2013.01); *G06T 2207/30252* (2013.01)

(58) Field of Classification Search
CPC . G06T 2207/10048; G06T 2207/20081; G06T 2207/30244; G06T 2207/30252
See application file for complete search history.

(56) References Cited

U.S. PATENT DOCUMENTS

| | | | |
|---|---|---|---|
| 10,109,104 B2 | 10/2018 | Newman et al. | |
| 2004/0105573 A1 | 6/2004 | Neumann et al. | |
| 2004/0201514 A1 | 10/2004 | Stappaerts | |
| 2006/0006309 A1 | 1/2006 | Dimsdale et al. | |
| 2006/0177104 A1* | 8/2006 | Prokoski | F42B 35/00 382/108 |
| 2007/0247612 A1 | 10/2007 | Pack et al. | |
| 2009/0323121 A1 | 12/2009 | Valkenburg et al. | |
| 2010/0121577 A1 | 5/2010 | Zhang et al. | |
| 2010/0316257 A1 | 12/2010 | Xu et al. | |
| 2010/0329513 A1* | 12/2010 | Klefenz | G01C 21/00 382/104 |
| 2011/0285842 A1* | 11/2011 | Davenport | B61L 23/04 348/116 |
| 2012/0062624 A1* | 3/2012 | Zhu | G09G 3/003 345/691 |
| 2012/0099395 A1 | 4/2012 | Debrunner et al. | |
| 2012/0099400 A1* | 4/2012 | Debrunner | G01S 15/025 367/99 |
| 2012/0162376 A1 | 6/2012 | Ohtomo et al. | |
| 2013/0151444 A1 | 6/2013 | Blaschko et al. | |
| 2014/0233845 A1* | 8/2014 | Wagner | G06T 17/00 382/154 |
| 2015/0098659 A1* | 4/2015 | Huang | G06F 17/30247 382/204 |
| 2015/0356357 A1* | 12/2015 | McManus | G06K 9/00791 382/104 |
| 2015/0379766 A1* | 12/2015 | Newman | G01S 17/87 356/5.01 |

FOREIGN PATENT DOCUMENTS

| | | |
|---|---|---|
| CN | 101640788 | 2/2010 |
| EP | 0 911 647 | 4/1999 |
| EP | 1 517 158 | 3/2005 |
| GB | 2 411 532 | 8/2005 |
| GB | 2 434 269 | 7/2007 |
| JP | H08-315125 | 11/1996 |
| JP | 2012-154863 | 8/2012 |
| WO | WO 2001/069171 | 9/2001 |
| WO | WO 2004/042662 | 5/2004 |
| WO | WO 2005/054799 | 6/2005 |
| WO | WO 2007/030026 | 3/2007 |
| WO | WO 2007/094765 | 8/2007 |
| WO | WO 2009/061174 | 5/2009 |
| WO | WO 2011/120141 | 10/2011 |
| WO | WO 2011/152841 | 12/2011 |
| WO | WO 2012/134419 | 10/2012 |

OTHER PUBLICATIONS

Shang, Global Search Methods for Solving Nonlinear Optimization Problems, Doctoral Thesis, University of Science and Technology of China, 1997, pp. 1-307.
Harrison et al., "TICSync: Knowing When Things Happened", *IEEE International Conference on Robotics and Automation*, 2011, pp. 356-343.
Abdel-Hakim et al., CSIFT: A SIFT Descriptor with Color Invariant Characteristics, *Proceedings of the 2006 IEEE Computer Society Conference on Computer Vision and Pattern Recognition*, 2006, in 6 pages.
Baldwin et al., "Road vehicle localization with 2D push-broom LIDAR and 3D priors", *Robotics and Automation (ICRA), 2012 IEEE International Conference*, 2012, pp. 2611-2617.
Barnard et al., "A Comparison of Computational Color Constancy Algorithms—Part I: Methodology and Experiments With Synthesized Data", *IEEE Transaction on Image Processing*, Sep. 9, 2002, vol. 11, No. 9, pp. 972-983.
Bay et al., "SURF: Speeded Up Robust Features", *Computer Vision—ECCV 2006*, 2006, pp. 404-417.
Borges et al., "Vision-based Localization Using an Edge Map Extracted from 3D Laser Range Data", *2010 IEEE International Conference on Robotics and Automation*, May 3-8, 2010, in 8 pages.
Calonder et al., "BRIEF: Binary Robust Independent Elementary Features", *Computer Vision—ECCV 2010*, 2010, in 14 pages.
Calonder et al., "BRIEF: Computing a local binary descriptor very fast", *IEEE Transactions on Pattern Analysis and Machine Intelligence*, 2012, vol. 34, No. 7, in 29 pages.
Cappelle et al., "Virtual 3D City Model for Navigation in Urban Areas", *J Intel Robot Syst*, 2012, vol. 66, pp. 377-399.
Churchill et al., "Practice Makes Perfect? Managing and Leveraging Visual Experiences for Lifelong Navigation", *Robotics and Automation (ICRA), 2012 IEEE International Conference*, 2012, pp. 4525-4532.
Corke et al., "Dealing with shadows: Capturing Intrinsic Scene Appearance for Image-based Outdoor Localisation", *2013 IEEE/RSJ International Conference on Intelligent Robots and Systems*, Nov. 3, 2013, pp. 2085-2092.
Cummins et al., "Appearance-only SLAM at large scale with FAB-MAP 2.0", *The International Journal of Robotics Research*, Nov. 12, 2010, in 25 pages.
Damen et al, "Egocentric Real-time Workspace Monitoring using an RGB-D camera", *Intelligent Robots and Systems (IROS), IEEE/RSJ International Conference*, Oct. 7, 2012, pp. 1029-1036.
Davison et al., "MonoSLAM: Real-Time Single Camera SLAM", *IEEE Transactions on Pattern Analysis and Machine Intelligence*, Jun. 2007, vol. 29, No. 6, in 16 pages.
Finlayson et al., "Color constancy at a pixel", *JOSA A*, 2001, vol. 18, No. 2, in 28 pages.
Finlayson et al., "Intrinsic Images by Entropy Minimization", *Computer Vision—ECCV*, 2004, pp. 582-595.
Finlayson et al., "On the Removal of Shadows From Images", *Pattern Analysis and Machine Intelligence, IEEE Transactions*, 2006, vol. 28, No. 1.
Fischler et al., "Random Sample Consensus: A Paradigm for Model Fitting with Applications to Image Analysis and Automated Cartography", *Communications of the ACM*, Jun. 1981, vol. 24, No. 6, pp. 381-395.
Foster, David H., "Color constancy", *Vision Research*, 2011, vol. 51, pp. 674-700.
Furgale et al., "Visual teach and repeat for long-range rover autonomy", *Journal of Field Robotics*, Sep. 1, 2010, vol. 27, No. 5, pp. 534-560.
Geiger et al., "Are we ready for Autonomous Driving? The KITTI Vision Benchmark Suite", *Computer Vision and Pattern Recognition (CVPR), 2012 IEEE Conference*, 2012, pp. 3354-3361.
Geiger, A., "Monocular road mosaicking for urban environments", *Intelligent Vehicles Symposium*, Jun. 3, 2009, pp. 140-145.
Glover et al., "FAB-MAP + RatSLAM: Appearance-based SLAM for Multiple Times of Day", *2010 IEEE International Conference on Robotics and Automation Anchorage Convention District*, May 3-8, 2010, in 6 pages.
Grasshopper 2 GS2-FW, Technical Reference Manual, *Point Grey*, 2011, in 171 pages.

(56) References Cited

OTHER PUBLICATIONS

Guo et al., "Single-Image Shadow Detection and Removal using Paired Regions", *Computer Vision and Pattern Recognition (CVPR), 2011 IEEE Conference*, 2011, pp. 2033-2040.
Ho et al., "Detecting Loop Closure with Scene Sequences", *International Journal of Computer Vision*, Jan. 2007, vol. 74, No. 3, pp. 261-286.
Jegou et al., "Hamming embedding and weak geometric consistency for large scale image search", *Computer Vision—ECCV*, 2008, in 16 pages.
Kosecka, Jana, "Detecting Changes in Images of Street Scenes", *Computer Vision ACCV*, Nov. 5, 2012, vol. 7727, pp. 590-601.
Kwatra et al., "Shadow Removal for Aerial Imagery by Information Theoretic Intrinsic Image Analysis", *Computational Photography (ICCP), 2012 IEEE International Conference*, 2012, pp. 1-8.
Lobo et al., "Bayesian 3D Independent Motion Segmentation with IMU-aided RBG-D Sensor", *IEEE Int Conf on on Multisensor Fusion and Integration for Intelligent Systems (MFI)*, Sep. 13-15, 2012, pp. 445-450.
Lowe, David G., "Object Recognition from Local Scale-Invariant Features", *The proceedings of the seventh IEEE international conference*, 1999, vol. 2.
Maddern et al., "LAPS-II: Using Illumination Invariance for 6-DoF Day and Night Localisation with Monocular Cameras", in 8 pages.
Maddern et al., "Towards Robust Night and Day Place Recognition using Visible and Thermal Imaging", *RSS 2012: Beyond laser and vision: Alternative sensing techniques for robotic perception*, 2012, in 7 pages.
McManus et al., "Distraction Suppression for Vision-Based Pose Estimation at City Scales", *Proceedings of the IEEE International Conference on Robotics and Automation*, May 6-10, 2013, in 8 pages.
McManus et al., "Shady Dealings: Robust, Long-Term Visual Localisation using Illumination Invariance", in 6 pages.
McManus et al., "Visual Teach and Repeat Using Appearance-Based Lidar", *Proceedings of IEEE International Conference on Robotics and Automation (ICRA)*, 2011, in 8 pages.
Milford et al., "SeqSLAM: Visual Route-Based Navigation for Sunny Summer Days and Stormy Winter Nights", *Proceedings of the IEEE International Conference on Robotics and Automation (ICRA)*, May 14-18, 2012, in 7 pages.
Napier et al., "Cross-Calibration of Push-Broom 2D LIDARs and Cameras in Natural Scenes", *Proceedings of 2013 IEEE International Conference on Robotics and Automation*, 2013, in 6 pages.
Nocedal et al., "Numerical Optimization, Second Edition", 2000, in 683 pages.
Nuske et al., "Extending the Dynamic Range of Robotic Vision", *Proceeding of the 2006 IEEE International Conference on Robotics and Automation*, May 2006, in 6 pages.
Nuske et al., "Robust Outdoor Visual Localization Using a Three-Dimensional-Edge Map", *Journal of Field Robotics*, 2009, vol. 26, No. 9, pp. 728-756.
Ranganathan et al., "Towards illumination invariance for visual localization", *Robotics and Automation (ICRA), 2013 IEEE International Conference*, 2013, in 8 pages.
Ratnasingam et al., "Chromaticity Space for Illuminant Invariant Recognition", *IEEE Transactions on Image Processing*, Aug. 2012, vol. 21, No. 8, pp. 3612-3623.
Ratnasingam et al., "Study of the photodetector characteristics of a camera for color constancy in natural scenes", *J. Opt. Soc. Am. A*, Feb. 2010, vol. 27, No. 2, pp. 286-294.
Rosten et al., "Real time video annotations for augmented reality", *Advances in Visual Computing*, 2005, in 33 pages.
Schiller et al., "Improved Video Segmentation by Adaptive Combination of Depth Keying and Mixture-of-Gaussians", *Field Programmable Logic and Application*, Jan. 1, 2011.
Stewart et al., "LAPS—Localisation using Appearance of Prior Structure: 6-DoF Monocular Camera Localisation using Prior Pointclouds", *Robotics and Automation (ICRA), 2012 IEEE International Conference*, 2012, in 8 pages.
Sunderhauf et al., "Are We There Yet? Challenging SeqSLAM on a 3000 km Journey Across All Four Seasons", *Workshop on Long-Term Autonomy, IEEE International Conference on Robotics and Automation (ICRA)*, 2013, in 3 pages.
Taneja et al., "Image Based Detection of Geometric Changes in Urban Environments", *IEEE Int Conf on Computer Vision*, Jun. 11, 2011, pp. 2336-2343.
Valgren et al., "SIFT, SURF and Season: Long-term Outdoor Localization Using Local Features", *EMCR*, 2007, in 6 pages.
Wang et al., "What could move? Finding cars, pedestrians and bicyclists in 3D laser data", *IEEE Int Conf on Robotics and Automation (ICRA)*, May 14, 2012, pp. 4038-4044.
Zhang et al., "Robust Appearance Based Visual Route Following for Navigation in Large-scale Outdoor Environments", *The International Journal of Robotics Research*, Mar. 1, 2009, vol. 28, No. 3, pp. 331-356.
Zhu et al., "Learning to Recognize Shadows in Monochromatic Natural Images", *Computer Vision and Pattern Recognition (CVPR), 2010 IEEE Conference*, 2010, in 8 pages.
International Search Report issued in PCT Application No. PCT/GB2015/051566, dated Sep. 9, 2015, in 4 pages.
Search Report issued in GB Application No. GB1409625.9, dated Nov. 19, 2014, in 3 pages.

\* cited by examiner

VEHICLE LOCALIZATION

The invention relates to localisation of a vehicle within an environment. In particular, but not exclusively, the localisation is performed using images generated from a sensor, such as a camera. Further, but again not exclusively, the images from the sensor may be transformed from an initial colour space to a further colour space.

Localisation methods can be implemented in any transportable apparatus; integration of such apparatus into a vehicle is a common approach, although not necessary. Discussion of a vehicle herein may equally be applied to non-vehicular transportable apparatus, for example man-portable apparatus.

Feature-based localisation can be understood as the act of matching run-time observed features to stored features and then estimating the pose and position of the apparatus given these associations. While the matching problem is simply stated, its execution can be difficult and complex. Two problems dominate: where to search for correspondences (and how big should a search window be?) and what to search for (what does the feature look like?).

For visual systems concerned with localising in known environments, dealing with appearance changes, either sudden or gradual, is a challenge. Appearance changes can result from several sources, such as (i) different lighting conditions, (ii) varying weather conditions, and/or (iii) dynamic objects (e.g., pedestrians, tree branches or vehicles). The second problem—what to look for—is therefore made more challenging by these variations.

According to a first aspect of the invention there is provided a computerised method of localising transportable apparatus within an environment comprising at least some of the following steps i) to v):
 i) obtaining a sequence of images of an environment around the apparatus;
 ii) generating one or more sequences of transformed images from the sequence of images wherein an image from the sequence has undergone a transformation to provide a transformed image within the sequence of transformed images;
 iii) using a processing circuitry to compare one or more images from the sequence of transformed images and one ore more images from at least one of:
  i) the sequence of images; and
  ii) at a further sequence of transformed images
  against a stored representation of the environment;
 iv) wherein the comparison is arranged to determine corresponding features within the images and/or transformed images and the stored representation; and
 v) localising the transportable apparatus according to a position of the one or more corresponding features.

Embodiments having each of the features i) to v) are advantageous in that they can localise (ie determine the position of) the apparatus more robustly and accurately.

Typically, the method is applied to a vehicle (such as a car, van, lorry or the like) and in particular to a vehicle that is arranged to navigate by itself. However, embodiments may be applied to other apparatus.

In some embodiments, the sequence of images obtained from the sensor and a single sequence of transformed images are each compared against the stored representation. In such embodiments, only one of the sequences compared to the representation has undergone a transformation; the untransformed sequence of images from the camera is also compared to the representation.

In alternative embodiments, two transformed image sequences, in which the images forming each sequence have been generated by a different transformation on the sequence of sensor images, are each compared against the stored representation. In such embodiments, each of the sequences of images compared against the representation has undergone a transformation.

In yet further embodiments, more than two sequences of images might be compared against the stored representation. For example, two sequences of transformed images and the sequence of un-transformed images may be compared against the stored representation.

In some embodiments, a decision is made as to which of the comparisons should be used to localise the apparatus; ie the method selects one of the two comparisons to use to localise the apparatus. In such embodiments the comparison that is performing better at that instance will typically be selected to localise the apparatus. For example, the comparison that has a higher number of recognised features therewithin may be selected.

In some embodiments, the representation of the environment is provided by one or more sequences of stored images. In such embodiments, the stored images may have been previously collected, for example by a survey vehicle. Alternatively, the stored images may have been collected earlier in the run-time; i.e. a representation of the environment may be built up progressively instead of being provided in advance.

In alternative embodiments, the representation of the environment is provided by a 3D model of the environment. Such a 3D model may be provided by a point cloud which in particular may be provided by a LIDAR point cloud. In still further embodiments, the representation of the environment is provided by a featured mesh or a model from photogrammetry, structure-from-motion or manual surveying, or the like.

In some embodiments, the sequence of stored images undergo transformations in order that at least one of the comparisons be performed.

Conveniently, the sequence of images is obtained using any of the following: an optical camera; a stereoscopic optical camera; a thermal imaging camera.

The images within the sequence of images may be within an RGB (Red Green Blue) colour space. The skilled person will understand that other colour spaces can be used.

Conveniently, the transformation performed on an image transforms the image into one of the following: an illumination invariant colour space; greyscale; a further colour space different from that of the untransformed images (e.g. a HSV (Hue Saturation Value), LAB or YUV colour space (where Y is a luma component and UV are each chrominance components).

According to a second aspect of the invention there is provided an apparatus arranged to perform a localisation of itself within an environment, the apparatus comprising at least some of the following:
a sensor arranged to generate a sequence of images of an environment around the apparatus;
a processing circuitry arranged to
 i) generate one or more sequences of transformed images from the sequence of images, wherein an image from the sequence of images has undergone a transformation to provide a transformed image within the sequence of transformed images;
 ii) compare, against a stored representation of the environment, one or more images from the sequence of transformed images and one or more images from at least one of: a) the sequence of images and b) at a further sequence of transformed images;

iii) determine, during the comparison, corresponding features within the images and/or the transformed images and the stored representation; and iv) localise the apparatus according to the position of the one or more corresponding features.

According to a third aspect of the invention there is provided a machine readable medium containing instructions, which when read by a computer, cause that computer to perform at least some of the following steps i) to v):

i) obtain a sequence of images of an environment around the apparatus;

ii) generate one or more sequences of transformed images from the sequence of images wherein an image from the sequence of images has undergone a transformation to provide a transformed image within the sequence of transformed images;

iii) compare one or more images from the sequence of transformed images and one or more images from at least one of:
   a) the sequence of images; and
   b) at a further sequence of transformed images against a stored representation of the environment;

iv) wherein the comparison is arranged to determine corresponding features within the images and/or transformed images and the stored representation; and v) localise the transportable apparatus according to a position of the one or more corresponding features.

According to a fourth aspect of the invention there is provided a computer implemented method of metric localisation of a transportable apparatus within a coordinate system representing an environment around the transportable apparatus, which determines co-ordinates of the transportable apparatus relative to the co-ordinate system including:

using a camera to generate images representing at least a portion of the environment;

processing the images to transform them into transformed images representing the portion of the environment in an illumination invariant colour space;

processing the transformed images to recognise elements of the environment within the transformed images; and localising the transportable apparatus within the co-ordinate system according to a position of the one or more recognised elements.

According to a fifth aspect of the invention there is provided an apparatus arranged to perform a metric localisation of itself within a coordinate system representing an environment around the transportable apparatus, the apparatus comprising at least some of the following:

a sensor arranged to generate a sequence of images of an environment around the apparatus;

a processing circuitry arranged to:

i) process the images to transform them into transformed images representing the portion of the environment in an illumination invariant colour space;

ii) process the transformed images to recognise elements of the environment within the transformed images; and iii) localise the transportable apparatus within the co-ordinate system according to a position of the one or more recognised elements and generate co-ordinates for the apparatus.

According to a sixth aspect of the invention there is provided a machine readable medium containing instructions, which when read by a computer cause the computer to perform a metric localisation of a transportable apparatus within a coordinate system representing an environment around the transportable apparatus, including at least some of the following:

i) obtain a sequence of images of an environment around the apparatus;

ii) process the images to transform them into transformed images representing the portion of the environment in an illumination invariant colour space;

iii) process the transformed images to recognise elements of the environment within the transformed images; and iv) localise the transportable apparatus within the co-ordinate system according to a position of the one or more recognised elements.

The skilled person will appreciate that a feature described above in relation to any one of the aspects of the invention may be applied, mutatis mutandis, to any other aspect of the invention.

In the above reference is made to a machine readable medium. Such a machine readable medium is exemplified by any one of the following: a hard-drive (whether based upon platters or a Solid State Drive (SSD)); a memory (such as a Flash drive; an SD card; a Compact Flash (CF) card; or the like); a CD ROM; a CD RAM; a DVD (including -R/-RW; RAM; and +R/+RW); any form of tape; any form of magneto optical storage; a transmitted signal (such as an Internet download; a transfer under the File Transfer Protocol (FTP); or the like); a wire; or the like.

There now follows by way of example only a detailed description of embodiments of the present invention with reference to the accompanying drawings in which.

Figure 10:
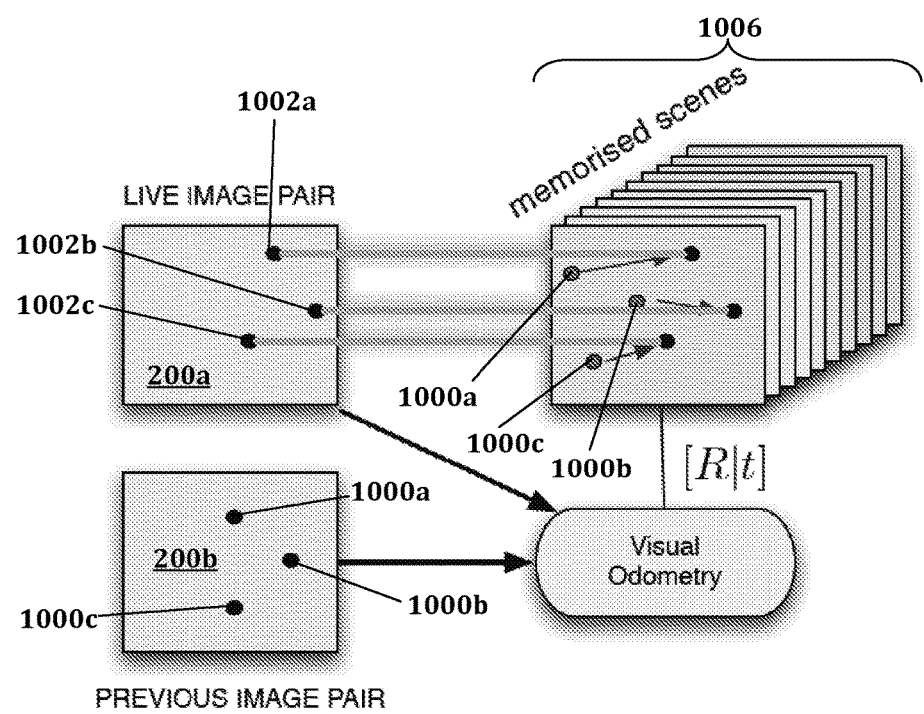
Figure 11:
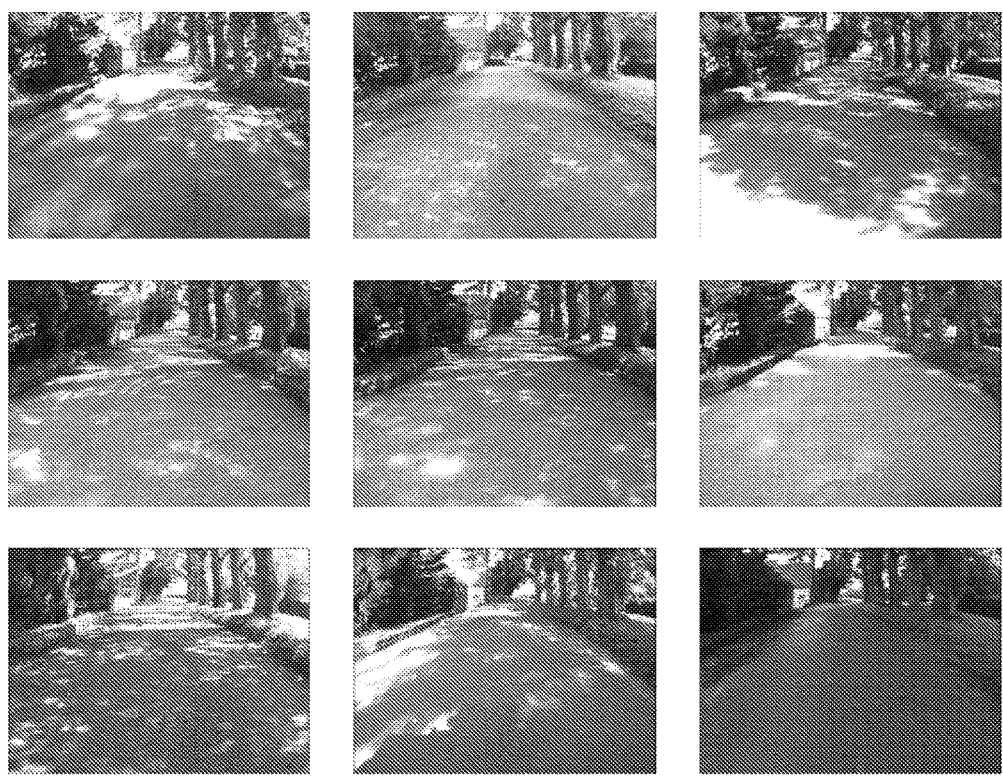

FIG. 10 schematically illustrates how using Visual Odometry output from a live image stream can be used to predict where features in the live frame should reproject in a survey keyframe; and FIG. 11 shows sample images illustrating the extreme variations due to lighting.

Embodiments of the invention are described in relation to a monitoring unit 10 comprising a sensor 100 where the monitoring unit 10 is mounted upon a vehicle 102. The sensor 100 is arranged to monitor the environment through which it moves and generate data based upon the monitoring thereby providing data on a sensed scene around the vehicle 102. Reference numerals for the method steps are marked with respect to FIG. 8.

In the embodiments herein, the vehicle 102 provides an example of a transportable apparatus which is moved through an environment. In other embodiments the transportable apparatus may be provided by articles other than a vehicle.

In the embodiment being described, the sensor 100 is a passive sensor (i.e. it does not create radiation and merely detects radiation) and in particular is a camera. More specifically, in the embodiment being described, the sensor 100 is a stereoscopic camera (such as the PointGrey Bumble-Bee); it comprises two cameras 104, 106. The skilled person will appreciate that such a sensor could be provided by two separate cameras rather than as a single sensor 100. Other embodiments may however rely on a single camera.

In the embodiment being described, the cameras 104, 106 comprise a Bayer filter. This particular embodiment has peak sensitivities at substantially the following wavelengths: 470 nm, 540 nm and 620 nm for Blue, Green and Red channels respectively as described in "*Grasshopper2 gs2-fw technical reference manual*", Point Grey Research, 2011. The skilled person will understand that many cameras have Bayer filters, and that the peak sensitivities will vary.

Figure 1:
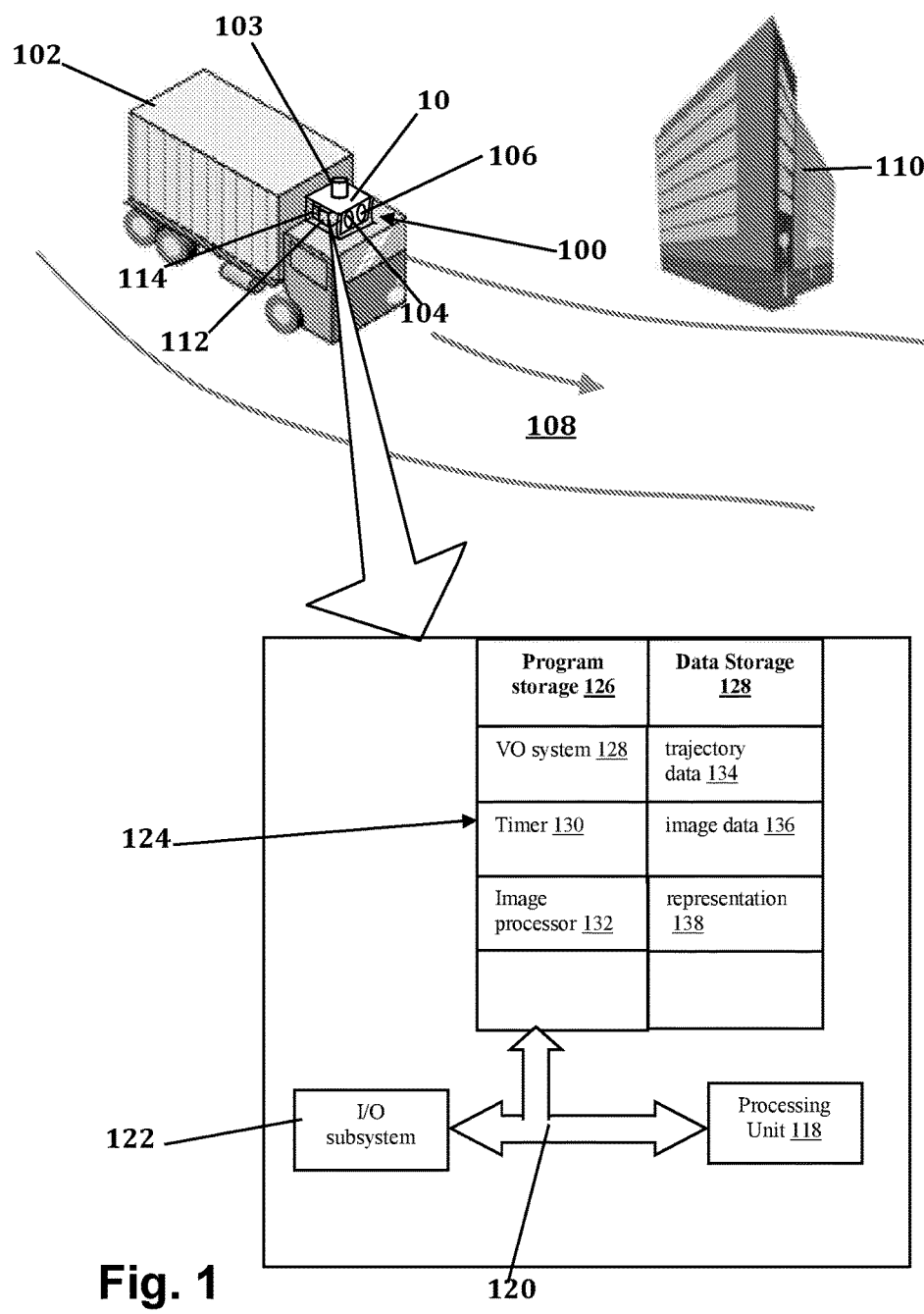
FIG. 1 shows a vehicle arranged to provide embodiments.

In the embodiment shown in FIG. 1, the vehicle 102 is travelling along a road 108 and the sensor 100 is imaging the environment (e.g. the building 110, road 108, etc.) as the vehicle 102 travels to generate 802 a sequence of images of that environment. In this embodiment, the monitoring unit 10 also comprises processing circuitry 112 arranged to capture data from the sensor 100 and subsequently to process 804a, 804b, 806, 808 the captured image from the sensor 100. In the embodiment being described, the processing circuitry 112 also comprises, or has access to, a storage device 114.

The lower portion of FIG. 1 shows components that may be found in a typical processing circuitry 112. A processing unit 118 may be provided which may be an Intel® X86 processor such as an i5™, i7™, Athlon™, Sempron™, Phenom™, A5, A7 processors or the like. The processing unit 118 is arranged to communicate, via a system bus 120, with an I/O subsystem 122 (and thereby with external networks, displays, and the like) and a memory 124.

The skilled person will appreciate that memory 124 may be provided by a variety of components including any form of machine readable data carrier such as volatile memory, a hard drive, a non-volatile memory, etc. Indeed, the memory 124 comprises a plurality of components under the control of the, or otherwise connected to, the processing unit 118.

However, typically the memory 124 provides a program storage portion 126 arranged to store program code which when executed performs an action and a data storage portion 128 which can be used to store data either temporarily and/or permanently.

In other embodiments at least a portion of the processing circuitry 112 may be provided remotely from the vehicle. As such, it is conceivable that processing of the data generated 802 by the sensor 100 is performed off the vehicle 102 or partially on and partially off the vehicle 102. In embodiments in which the processing circuitry is provided both on and off the vehicle then a network connection is used (such as a 3G UMTS (Universal Mobile Telecommunication System), 4G (such as Mobile WiMAX and Long Term Evolution (LTE), WiFi (IEEE 802.11) or like).

In the embodiment shown, the program storage portion 126 at least comprises an image processor 132, an interest point-detector, Visual Odometry (VO) system 128 and a timer 130. Visual Odometry is the process of determining 810 position and orientation by analysing 806, 808 the associated camera images; it can be used as a form of dead reckoning using sequential images. It can also be used to determine 810 position and orientation relative to a stored, non-sequential image or to a stored representation of the environment. In alternative or additional embodiments, sensor 100 may provide time and date information, obviating the need for a separate timer.

The data storage portion 128 in the embodiment being described contains image data (ie a sequence of images from the sensor) 136, a representation 138 of the environment (ie a representation of the environment—whether a prior model or stored images representing the environment) and trajectory data 134. In some embodiments, the image data 136 and the representation 138 of the environment form a single data set. In embodiments in which a VO system 128 is not used to calculate trajectory, trajectory data 134 may not be present or may take a different form.

The processing circuitry 112 receives the image data from the sensor 100 and is arranged to process 804a, 804b, 806, 808 that image data as described below. However, at least part of that processing is arranged to provide a so-called Visual Odometry (VO) system which is in turn used as part of a localisation process. The skilled person will appreciate that localisation of a vehicle, or other transportable apparatus, is the determination of the position of that vehicle, or the like, within an environment.

The processing of the image data by the processing circuitry 112 includes what may be termed a keyframe-based visual odometry (VO) pipeline. Keyframes comprise feature detections, landmarks, descriptors, relative transformation to the previous/another keyframe and a time stamp. In the embodiment being described, the images output from the sensor 100 are stored for visualisation purposes. Here, the sequence of images from the sensor 100 provide what may be thought of as a pipeline of images; one image after another. In the embodiment being described, the sensor is a stereo pair of cameras and as such, the image pipe line generated 802 by the sensor 100 comprises a stream of pairs of images with one of the images from each pair being taken by each of the cameras 104, 106. Thus, each image within the pair is taken substantially at the same instance in time.

The processing circuitry 112 is arranged to provide an interest-point detector which is arranged to process both of the stereo images within the stream of images to extract features from those images. In the embodiment being described, the interest-point detector is provided by a FAST (Features from Accelerated Segment Test) detector as described in E. Rosten, G. Reitmayr, and T. Drummond, "*Real-time video annotations for augmented reality*", in Advances in Visual Computing, 2005. The skilled person will understand that different features may be extracted and that different methods may be used for identifying features.

Once features have been extracted the processing circuitry is further arranged to locate the same features within each of the images of each pair; i.e. to find stereo correspondences. The embodiment being described uses a patch-based matching process to assist in the location of such corresponding points within the images. Further, in the embodiment being described, the processing circuitry is further arranged to compute BRIEF descriptors, as described in M. Calonder, V. Lepetit, M. Ozuysal, T. Trzcinski, C. Strecha, and P. Fua, "*Brief Computing a local binary descriptor very fast*", IEEE Transactions on Pattern Analysis and Machine Intelligence, vol. 34, no. 7, pp. 1281-1298, 2012, for each stereo measurement. The skilled person will understand that BRIEF descriptors are one example of a suitable descriptor type, and that other descriptors may be used.

In addition to determining the stereo correspondences, the processing circuitry is also arranged to compute a 3D estimate of the position of each of the extracted features relative to the frame of the cameras 104,106. When a new stereo frame is acquired (i.e. the next frame within the stream of images), features are extracted and matched 808 to the previous frame, initially with BRIEF matching (in embodiments wherein different descriptors are used, a corresponding matching method is used), and then refined using patch-based matching to achieve sub-pixel correspondences which patch-based matching is described further below.

Thus, the VO system builds up a trajectory of the vehicle 102 since the processing circuitry 112 tracks extracted features between frames of the stream of images. In the embodiment being described, the processing circuitry 112 also employs RANSAC (see M. A. Fischler and R. C. Bolles, "*Random Sample Consensus: A Paradigm for Model Fitting with Applications to Image Analysis and Automated Cartography*", Communications of the ACM, vol. 24, p. 381395, 1981, for details) for outlier rejection to improve the trajectory estimate. As a final step, the trajectory is provided by a nonlinear solver to produce the frame-to-frame transformation estimate.

At least some embodiments, including the one being described, make reference to a previously captured, or otherwise generated, representation of the environment through which the vehicle 102 moves which representation may be thought of as a model of the environment and/or a prior. The representation may be captured by moving a survey vehicle through the environment and recording at least some of the parameters generated by the VO system. For example, the representation may be provided by at least some of the following parameters: a series of keyframes with feature locations; descriptors (e.g. BRIEF descriptors); pixel patches; 3D landmarks; relative transformation estimates; or the like.

In alternative, or additional, embodiments, a previously captured model of the environment is not available or may not solely be relied upon. In these alternative, or additional, embodiments, Experience Based Navigation may be performed, wherein a map of the environment is built up from the images from the sensor generated 802 as the vehicle 102 moves through the environment. Identified features in the images captured from the sensor are matched 808 to identified features in earlier images.

Thus, embodiments may be utilised in both so-called Experience Based Navigation as exemplified in Patent Application PCT/GB2013/050299—METHOD OF LOCATING A SENSOR AND RELATED APPARATUS, or in localisation.

Regardless of whether Experienced Based Navigation, navigation against a prior model of the environment, or a combination of both is used, the localisation may be so-called metric or topological. In so-called metric localisation a co-ordinate system exists to which the location of the transportable apparatus can be referenced.

The parameters constituting the representation will typically be stored in the data storage portion 128 but will otherwise be accessible by the processing apparatus 112.

In use, embodiments employed on the vehicle 102 are arranged to process both the output of the VO system and also to process the representation constituted by the previously stored parameters. In order to localise the current stream of images to the representation, embodiments are arranged to use a similar VO pipeline as the one described above. However, the live VO pipeline is arranged to, instead of matching to the previous camera frame, match to one or more keyframes held within the representation.

In some embodiments the representation is held via stored images of the environment (that is embodiments employing Experienced Based Navigation) and in such embodiments localisation is performed relative to those stored images of the environment. A survey vehicle may be used to generate the stored images at an earlier date. Alternatively, or additionally, the apparatus may also be arranged to collect the stored images as it travels.

Alternatively, or additionally, the model may be provided by point clouds, such as a LIDAR generated point cloud.

As mentioned above, at least some embodiments, including the one being described, use a patch-based process to simplify the VO process. Embodiments employing this patch-based process are advantageous due to an improved robustness in matching a live view (i.e. the current images output from the cameras 104, 106) with a survey view (i.e. against the representation which may comprise stored images). The patch-based approach tries to predict how the measurements in the survey frame (e.g. keyframes of the representation) should reproject in the live frame (e.g. images output from the cameras 104, 106). At least some of the embodiments are arranged to use uncertainty in the map, measurements, prior pose estimate, and latest VO estimate, to compute the covariance of the reprojected measurements from an image of the representation into a current image from the cameras 104, 106. In turn, the covariance can be used to define a search region in the live view as is illustrated in FIG. 10 (discussed later). Embodiments which generate such a search region are advantageous since they reduce the likelihood of bad data associations.

Embodiments are arranged to process at least one of the images from the representation and the images from the camera to remove the effects of lighting (ie to transform the image) within the image as is now described. Thus, embodiments will typically generate a sequence of transformed images in which each image of the sequence corresponds to an image from sequence of images output from the camera which has been transformed. Such embodiments are advantageous in order to improve the chances of matching features within the images irrespective of changes in lighting. Some embodiments may be arranged to process both the images from the model and the images from the camera to remove the effects of lighting.

Figure 2:
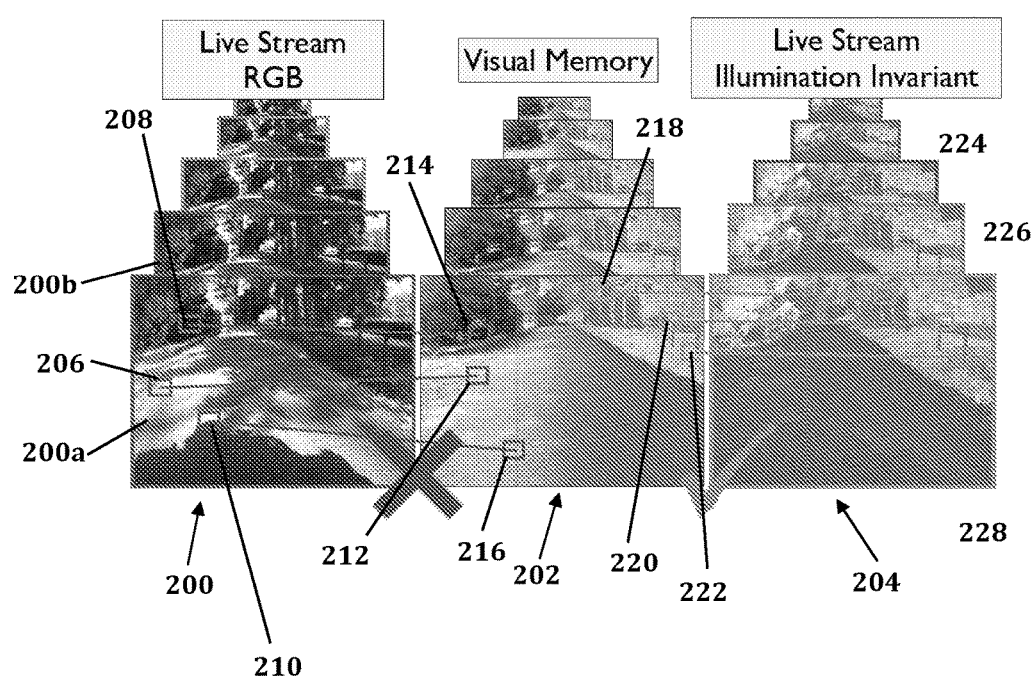
FIG. 2 shows examples of an image recognition process performed by an embodiment.

Specifically to perform the patch-matching, embodiments, given a search region for a potential match, find the sub-pixel location that minimises the score between the reference patch from the images of the representation and the image from the camera. However, as illustrated in FIG. 2, this approach can fail when the appearance change is too significant, for example due to a change in lighting effects, between the image from the representation 202 (labelled visual memory in FIG. 2) and the image from the camera 200 (labelled Live Stream RGB in FIG. 2). Therefore, embodiments are arranged to generate so-called illumination invariant images, which uses a transformation from the standard RGB colour space which is the output from the camera in the embodiment being described.

Therefore, in the embodiment being described, the features extracted from the images by the interest-point detector from one image are compared 806 against features extracted from another image which is typically either a stored image or a transformed stored image as described elsewhere. This comparison 806 is ordinarily provided by the localisation process, such as process 920 and 922 within FIG. 9. Thus, the localiser, in making the comparison, determines 808 corresponding features within images and/or transformed images and the representation. Thus, the comparison may also be referred to feature matching; patch-matching or the like.

The left hand region of FIG. 2 shows a portion 200 of the sequence of images generated from one of the cameras 104, 106. The skilled person will appreciate that, in the embodiment being described, the sequence of images is a stereo sequence (ie there are two images of each instance of each scene), however it is convenient, for clarity, to show only one of the stereo sequences of images. In the embodiment being described, the images are RGB images. At least some, and typically each, of the images may have meta-data associate therewith. Such meta-data may include one or more of the following: a timestamp, location and camera spectral response, make, model, exposure, gain, shutter and/or controls, or the like.

The central region 202 of FIG. 2 shows a portion of the sequence of stored images which constitute at least part of the representation held within the memory 124. These stored images would be typically be the keyframes described above.

The right hand region 204 of FIG. 2 shows a sequence of transformed images to which a transformation 804a, 804b, as described in more detail below, has been applied which transform removes the affects of illumination on the image. As such, the images 204 to which the transform has been applied can be thought of as being a sequence of illumination invariant images. The transformed images are generated by the processing circuitry 112 which takes, as an input, the sequence of images and applies the transform 804a, 804b to generate the transformed images 204. The transformed images may also have meta-data associated therewith.

In alternative embodiments, where the sensor 100 is other than a camera, the images may be replaced by another form of representation of the environment. For example, should a LIDAR be used the representations of the environment may be provided by a point cloud generated by the scanner.

The sequence of images 200 and the sequence of transformed images 204 are compared 806 to the representation which in FIG. 2 is a series of stored images 202. In the example shown in FIG. 2, the comparison 806 of the stored images 202 to the images 200 fails to recognise points 206, 208 and 210 in the images 200 as corresponding to points 212, 214 and 216 in the stored images 202. Here, it will be seen that the images 200 contain a significant amount of shadow, which despite the image 200 being of the same environment as the corresponding stored image 202, has led to this recognition failure.

However, successful recognition of points 218, 220 and 222 in the transformed image corresponding to points 224, 226 and 228 in the stored image 202 is achieved. It will be seen that in the transformed image, which it will be recalled is an illumination invariant image in the embodiment being described, the shadows have been removed (or at least significantly reduced) thereby increasing the similarity between the transformed image 204 and the stored image 202.

In the embodiment being described with reference to FIG. 2, the data resulting from the inconclusive comparison of the image 200 and the stored image 202 are discarded and the data resulting from the successful comparison of the transformed image 204 are used to localise the vehicle 102. That is, in this embodiment, a decision is made as to whether to use the images 200 or the transformed image 204 to localise the vehicle 102.

Transformation to an illumination invariant colour space is used in the embodiment being described. In other embodiments, different or additional transformations are used, for example transformation to a different colour space, such as greyscale or another monochromatic colour space, or an illumination invariant greyscale colour space, or the like.

The transformation used to transform 804a or 804b the images 200 into an illuminant invariant colour space is now described. Embodiments using such a transformation have an improved consistency of scene appearance over a range of outdoor illumination conditions. For a recent review of state-of-the-art approaches to illumination invariant imaging, otherwise known as colour constancy, the reader is referred to D. H. Foster, "*Color constancy*", Vision research, vol. 51, no. 7, pp. 674-700, 2011.

The following equation describes the relationship between the response of a linear image sensor R with spectral sensitivity F(λ) to an illumination source with emitted spectral power distribution E(λ) incident on an object with surface reflectivity S(λ), as described in G. D. Finlayson and S. D. Hordley, "*Color constancy at a pixel*", JOSA A, vol. 18, no. 2, pp. 253-264, 2001:

$$R^{x,E} = \underline{a}^x \cdot \underline{n}^x I^x \int S^x(\lambda) E^x(\lambda) F(\lambda) d\lambda \quad (1)$$

where the unit vectors $\underline{a}^x$ and $\underline{n}^x$ represent the direction of the light source and the direction of the surface normal, and $I^x$ represents the intensity of the illuminant on point x in the scene. From equation 1 we wish to obtain an image feature $I$ that depends on the material properties $S^x(\lambda)$ of the surface at point x, while minimising the effect of illumination source spectrum $E^x(\lambda)$ and intensity $I^x$. The embodiment being described follows the approach in the paper of G. D. Finlayson and S. D. Hordley mentioned above and assumes that the spectral sensitivity function F(λ) can be modelled as a Dirac delta function centred on wavelength $\lambda_i$, which yields the following response function:

$$R^{x,E} = \underline{a}^x \cdot \underline{n}^x I^x S^x(\lambda_i) E^x(\lambda_i) \quad (2)$$

Although an infinitely narrow band spectral response assumption is unrealistic for most practical image sensors, results in S. Ratnasingam and S. Collins, "*Study of the photodetector characteristics of a camera for color constancy in natural scenes*", JOSA A, vol. 27, no. 2, pp. 286-294, 2010 indicate that colour constancy performance is maintained under this assumption with realistic 60-100 nm full width at half-maximum (FWHM) sensor responses.

The embodiment being described takes the logarithm of both sides of equation 2 to separate the components as follows:

$$\log(R^{x,E}) = \log\{G^x I^x\} + \log\{S^x(\lambda_i)\} + \log\{E^x(\lambda_i)\} \quad (3)$$

where $G^x = \underline{a}^x \cdot \underline{n}^x$ is the relative geometry between illuminant and scene. This yields a linear combination of three components: a scene geometry and intensity component; an illuminant spectrum component; and a surface reflectance component. For outdoor scenes illuminated by natural lighting it is reasonable to model the illuminant spectrum as a black-body source (see the paper of G. D. Finlayson and S. D. Hordley mentioned above), and as such we can substitute the Wien approximation to a black-body source for the illuminant spectrum term in equation 3:

$$\log(R_i) = \log\{G\ I\} + \log\{2hc^2 \lambda_i^{-5} S_i\} - \frac{hc}{k_B T \lambda_i} \quad (4)$$

where h is Planck's constant, c is the speed of light, $k_B$ is the Boltzmann constant and T is the correlated colour temperature of the black-body source. Note that for all references to the term "illumination invariant" herein, reference is made to a colour space that makes this assumption; that the source illuminant is approximately black-body. It is conceivable that other embodiments may use other assumptions where it cannot be assumed that the illumination is approximately black-body.

The first and third terms of equation 4 can be eliminated by incorporating sensor responses at different wavelengths $\lambda_i$. The embodiment being described follows the approach proposed in S. Ratnasingam and S. Collins, "*Study of the photodetector characteristics of a camera for color constancy in natural scenes*", JOSA A, vol. 27, no. 2, pp. 286-294, 2010 and use a one-dimensional colour space $\mathcal{I}$ consisting of three sensor responses $R_1$, $R_2$, $R_3$ corresponding to peak sensitivities at ordered wavelengths $\lambda_1 < \lambda_2 < \lambda_3$:

$$\mathcal{I} = \log(R_2) - \alpha \log(R_1) - (1-\alpha)\log(R_3) \quad (5)$$

The colour space $\mathcal{I}$ will be independent of the correlated colour temperature T if the parameter satisfies the following constraint:

$$\frac{hc}{k_B T \lambda_2} - \frac{\alpha hc}{k_B T \lambda_1} - \frac{(1-\alpha)hc}{k_B T \lambda_3} = 0 \quad (6)$$

which simplifies to $$\frac{1}{\lambda_2} = \frac{\alpha}{\lambda_1} - \frac{(1-\alpha)}{\lambda_3} \quad (7)$$

therefore $\alpha$ can be uniquely determined for a given camera simply with knowledge of the peak spectral responses of the Bayer filter. A value for $\alpha$ can often be obtained from a datasheet provided with the data source. For example, $\alpha$=0.4800 for a Point Grey Bumblebee2 camera.

As demonstrated in S. Ratnasingam and T. M. McGinnity, "*Chromaticity space for illuminant invariant recognition*", Image Processing, IEEE Transactions on, vol. 21, no. 8, pp. 3612-3623, 2012, a Dirac-delta sensor response and blackbody source assumption provides good results for colour discrimination in outdoor scenes illuminated primarily by natural lighting. Note that a single illumination invariant feature is usually insufficient to uniquely identify a particular colour, however it is sufficient to differentiate between different surfaces in the scene (S. Ratnasingam and S. Collins, "*Study of the photodetector characteristics of a camera for color constancy in natural scenes*", JOSA A, vol. 27, no. 2, pp. 286-294, 2010).

Figure 3:
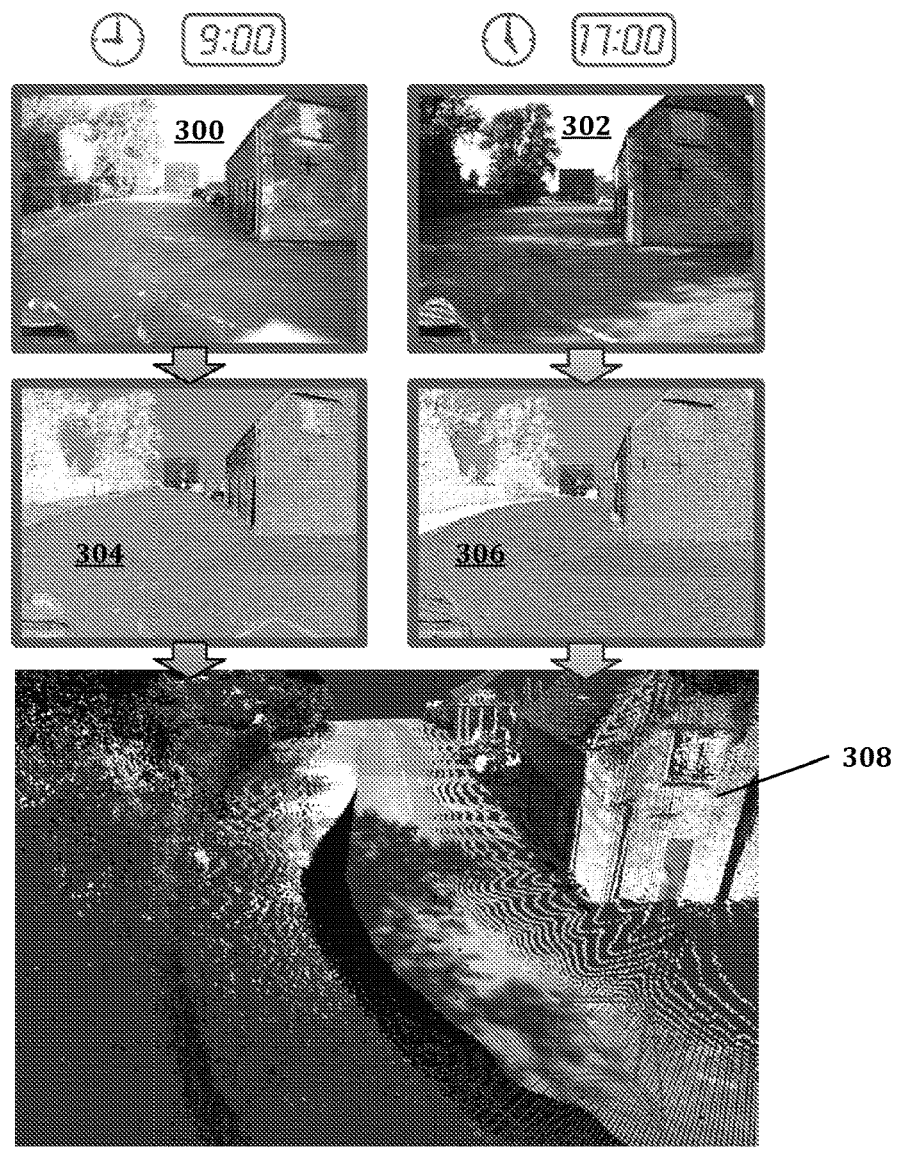
FIG. 3 shows examples of using illumination invariant images to relative to a 3D pointcloud at different times of day.

The illumination invariant colour space is illustrated in FIG. 3. Despite large changes in sun angle, shadow pattern and illumination spectrum between images captured at 9 am and 5 pm, both illumination invariant images show significantly less variation. Specifically, it can be seen that image 300 is an image captured at 9:00 am whereas image 302 is captured at 17:00. The skilled person will note that there is significant illumination (eg shadow) variation differences between the image 300 and 302. 304 is a transformed image generated from image 300 and 306 is a transformed imaged that has been generated from image 302. It will be seen that effect of the illumination change has been significantly reduced and transformed images 304 and 306 are largely similar.

308 shows a 3D LIDAR point cloud model of the environment and is, in one embodiment, used as the representation to which the images and/or transformed images are compared to localise the vehicle 102.

Transforming the stream of images from the camera using Equation 5 can be performed on a per-pixel basis, and is therefore inexpensive in terms of the amount of processing that is required from the processing circuitry 112. As such, embodiments may be arranged to perform the transformation in parallel to other computational tasks.

Thus, at least some embodiments utilise two parallel processes: a VO pipeline comparing 806 images from the representation (ie stored images) against images from the camera; and a second VO pipeline comparing 806 images from the representation (ie stored images) against images from the camera which have been transformed (ie transformed images).

In alternative or additional embodiments, images from the representation (ie stored images) are transformed in one or more of the VO pipelines used (ie transformed stored images). In some embodiments, one VO pipeline compares live images from the camera to earlier images from the camera (ie stored images) and a second VO pipeline compares transformed images from the camera to earlier images from the camera (ie stored images). In alternative or additional embodiments, the earlier images from the camera are transformed before use in at least one of the VO pipelines. In alternative embodiments, the images from the camera are not transformed and the earlier images from the camera are transformed.

Thus, at least some embodiments, including the one being described, run two VO pipelines in parallel. In alternative or additional embodiments, more than two VO pipelines are used. In some embodiments, three or more VO pipelines are available within the processing circuitry 112 and fewer than the total number of VO pipelines available are used in parallel during certain periods. For example, RGB, greyscale and illumination invariant transformation VO pipelines may be available and only the RGB and illumination invariant transformation VO pipelines may be used during the day or when light levels are above a threshold value.

It will be appreciated that at night the assumption that illumination is from black-body radiation may not hold and therefore an illumination invariant transform may not perform as well as may be desired. As such, at night or when light levels are below a threshold value, only the greyscale and illumination invariant transformation VO pipelines may be used. In some examples, more or all available pipelines may be used at around the switch-over point between regimes. In the example given above, RGB, greyscale and illumination invariant VO pipelines may all be used in parallel at dusk and dawn, or when the light level is near or at the threshold value.

In the embodiment being described, if the VO pipeline based upon the untransformed images from the camera can be used to localise 810 the position of the vehicle 102 then that VO pipeline is used. However, should such a localisation fail the other VO pipeline, based upon the transformed images from the camera, is used to attempt to localise the position of the vehicle 102.

Figure 7:
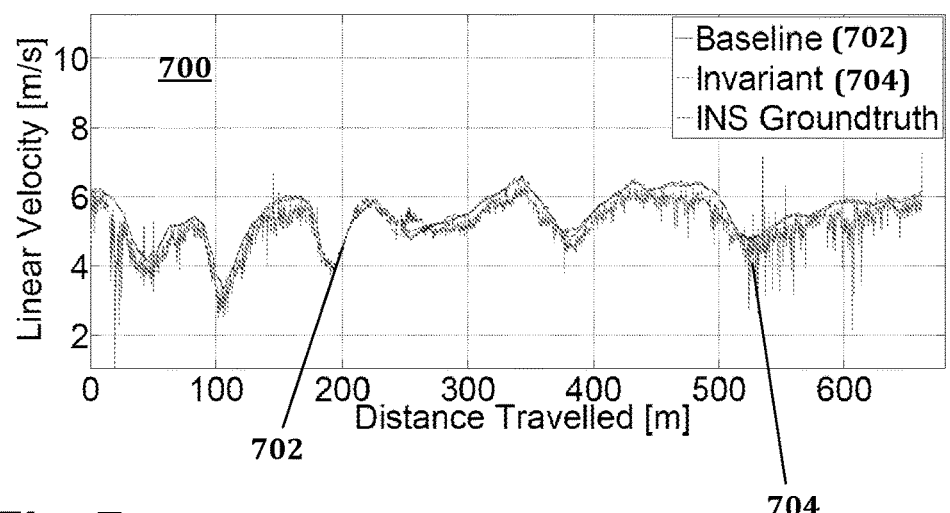
FIG. 7 shows representative velocity estimates generated by each of the parallel data streams alone as compared to the actual velocity.

The reason for defaulting to the "baseline" system in this embodiment is highlighted in the graph 700 of FIG. 7, which shows a representative velocity profile both with (line 704) and without (line 702) using the illumination invariant VO pipeline. The velocity estimates using the illumination invariant VO pipeline 704 are noisier than the velocity estimates using the RGB VO pipeline 702 and appear to have a slight bias when compared to groundtruth.

For this reason, the two estimates of position generated by the VO pipelines are not fused; instead the system uses them in parallel and switches between them, with the policy of defaulting to the baseline system (with no transformation being performed on the images from the cameras 104, 106) when possible.

Figure 8:
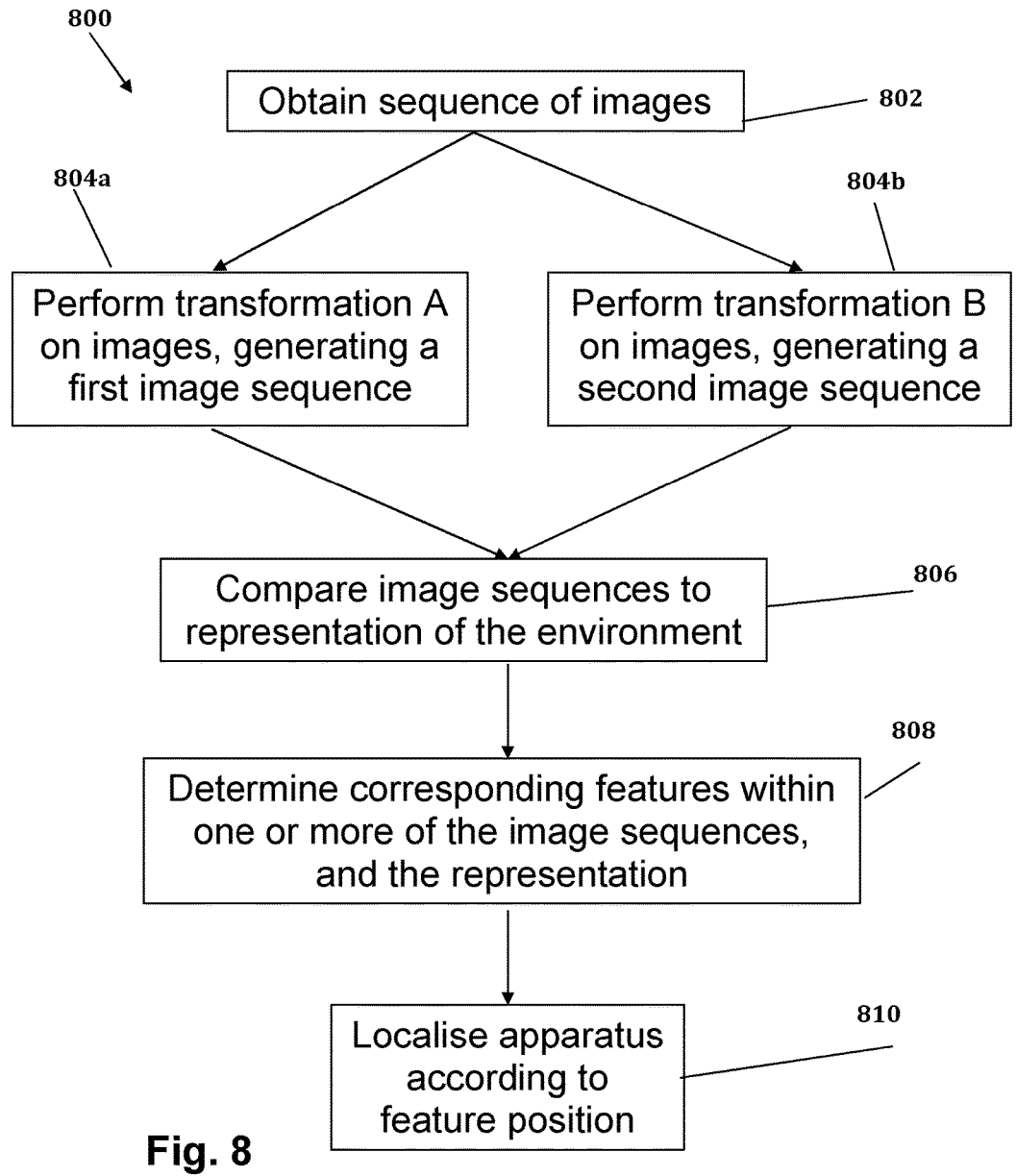
FIG. 8 shows a flow-chart of the method of an embodiment.

In other embodiments, the baseline is defined differently or there is not a defined baseline and which VO pipeline to use is decided depending on the quality of the localisation estimates provided. The quality of the localisation estimates may be assessed based on the number of features matched 808 and/or the associated certainties of the matches found being correct FIG. 8 provides a flow-chart of the method of an embodiment. As previously discussed, step 804a and 804b are the transformations of the image sequence from the camera. In some embodiments, one of transformation A (804a) and transformation B (804b) is no transformation, i.e. the untransformed images from the sensor are used. In alternative embodiments, both transformation steps (804a, 804b) transform the images from the camera.

Figure 9:
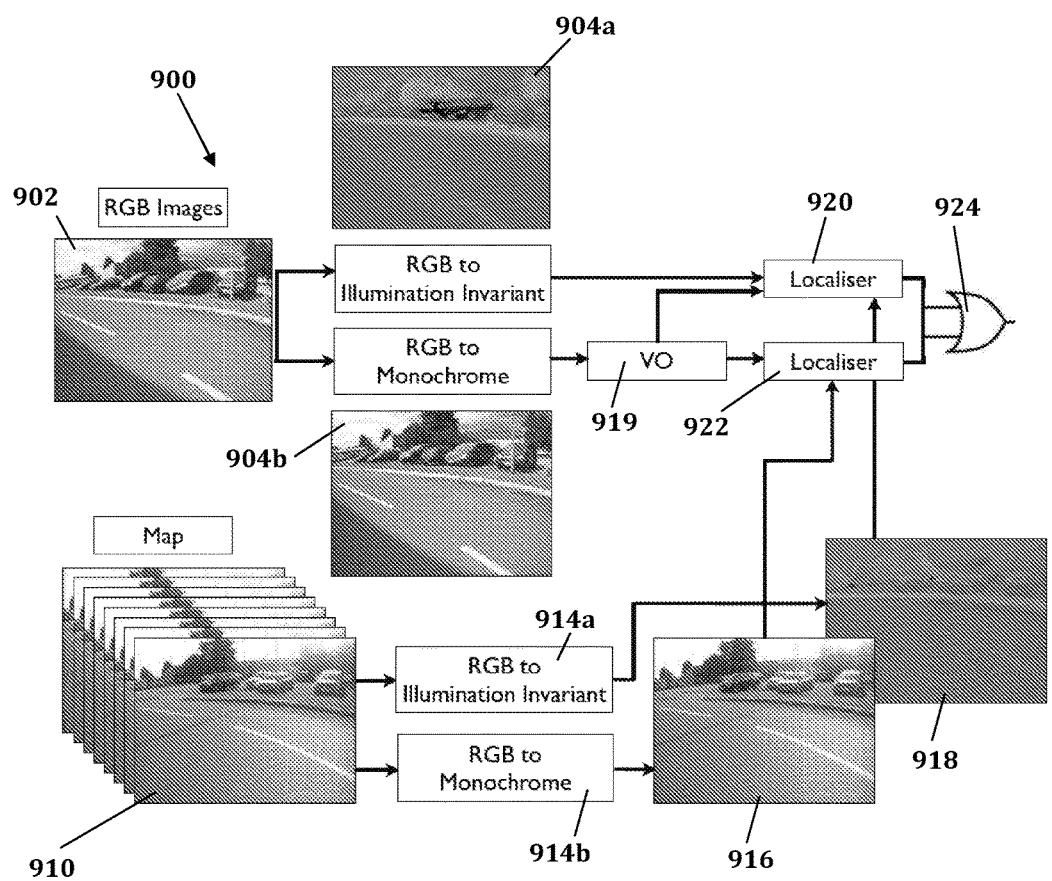
FIG. 9 shows an alternative embodiment including an additional process optimisation step.

In the embodiment shown in FIG. 9, the image processing system 900, which is provided by the processing circuitry 112, is more complex. As before, the pathways within the image processing system 900 are referred to as VO pipelines.

The images from the camera 902 undergo two transformations 804a, 804b (RGB to illumination invariant 904a and RGB to monochrome 904b), forming two generated image streams each of which comprises transformed images 904.

In this embodiment, the representation of the environment is provided by stored images 910. Here the stored images 910 are RGB images, but this need not be the case and other embodiments may store transformed images.

In the embodiment being described, the stored images 910 undergo equivalent transformations 914a, 914b to those performed to generate the transformed images 904a and 904b, forming two sets of transformed stored images 916, 918 for use in the localisation process 810. In alternative embodiments, the stored images undergo a single transformation or no transformation, or undergo multiple transformations to generate multiple sets of stored transformed images.

Thus, it is seen that the illumination invariant transformed images 904a are localised 920 against the stored transformed (illumination invariant) images 918. The monochrome transformed images 904b are localised 922 against the stored transformed (monochrome) images 916.

As discussed above, in the embodiment being described, the VO pipelines are not fused and a simple OR selection 924 is made as to which of the pipelines should be used to localise the vehicle 102. Thus, the method selects one of the two VO pipelines to localise the apparatus.

FIG. 10 is used to describe a further method employed in some embodiments to assist in the localisation process. As described above, the cameras generate 802 a sequence of images, such as the images 200 shown in FIG. 2. In FIG. 2 the image shown at the front 200a of the Figure may be thought of as the live image (ie the image currently being processed) and the image that was generated before that (behind in FIG. 2) may be thought of as the previous image 200b. The skilled person will appreciate that here image in fact may relate to a stereoscopic image pair as in the embodiment being described where a pair of cameras is used.

In the embodiment being described, the VO pipeline utilises information derived from at least the previous images 200b to constrain the localisation process 810 in the live image 200a. Other embodiments could use images prior to the previous image in addition to or instead of using the previous image to constrain the localisation process 810.

In the localisation system 900, the sequence of images output from the cameras is used to calculate the trajectory of the vehicle 102. Within FIG. 10, three points 1000a, b, c are highlighted within the previous image 200b. These same three points are highlighted within the live image 200a at 1002, a, b, c. However, it will be seen that, relative to the image, the points 1002 have moved when compared to the points 1000. This relative movement is due to the motion of the vehicle 102.

If localisation has occurred for the previous image 200b and the points located in a stored image 1006 (eg a memorised scene or model of the environment) the position of the points 1000a, b, c within the stored image together with the trajectory of the vehicle 102 can be used to constrain the search for the points 1002a, b, c within the live image.

Embodiments that use this method of constraining the search are advantageous as they are more efficient and have a reduced likelihood of spurious matches. The method as outlined in relation to FIG. 10 may be referred to as patch-matching.

In one embodiment and because the VO trajectory estimates using illumination invariant images are not as accurate as those using monochrome images (as described elsewhere), the VO trajectory estimate from the monochrome images is used to perform the feature prediction in the illumination-invariant feature space. In other words, the most recent frame-to-frame VO trajectory estimate from the monochrome images 920 can be used to help inform the lighting-invariant VO pipeline 918 where to look.

Embodiments similar to that shown in FIG. 9 use the un-transformed image VO pipeline to constrain the transformed image VO pipeline in a similar manner to the patch matching as described above, in relation to FIG. 10. That is, a feature prediction that is obtained form the un-transformed image VO pipeline can be used to predict where features should appear in the transformed image VO pipeline which can increase the robustness of the transformed image VO pipeline. It will be appreciated that both of the VO pipelines of FIG. 9 rely on transformed images (RGB to monochrome and RGB to illuminant invariant).

FIG. 11 shows images highlighting extreme visual variation encountered by a test vehicle 102 along parts of a route. Each of the images within FIG. 11 is of the same view of the environment around a vehicle 102 but appears different due to the change in lighting.

To clarify terminology for the following description, the system that does not use invariant imagery (RGB only; i.e. using the un-transformed image VO pipeline) is the baseline system, the system that uses invariant imagery (i.e. the transformed image VO pipeline) only is the invariant system, and the system that combines them both is the combined system.

Fifteen datasets were taken and were processed using an exhaustive leave-one-out approach, whereby each dataset was taken as the live image stream, and localisation was performed against the remaining 14 datasets in turn.

The results are shown with Table I, which presents the percentage coverage using each of the 15 datasets as the live run. The percentage coverage is defined as the number of successfully localised frames versus the total number of frames, averaged over the 14 datasets compared against. In all cases the invariant system provides improvement to the baseline system, meaning the combined system always out-performs the baseline. It should be noted that the baseline system already performs well despite the difficult lighting conditions. However, in the context of long-term autonomy for robotics (e.g. autonomous vehicles) is useful to increase the, robustness and as such any increase in reliability is useful.

TABLE I

COVERAGE RESULTS COMPARING OUR COMBINED SYSTEM VERSUS THE BASELINE SYSTEM. COVERAGE IS DEFINED AS THE NUMBER OF SUCCESSFULLY LOCALISED FRAMES AS A FRACTION OF THE TOTAL NUMBER OF CAPTURED FRAMES. AVERAGING OVER 14 TRAINING DATASET PER TEST DATASET.

| Dataset Number | Baseline System | Combined System |
| --- | --- | --- |
| 1 | 79.93% | 83.19% |
| 2 | 92.68% | 95.74% |
| 3 | 91.12% | 94.59% |
| 4 | 95.81% | 96.65% |
| 5 | 94.19% | 95.80% |
| 6 | 93.64% | 95.74% |
| 7 | 95.64% | 98.30% |
| 8 | 96.29% | 97.60% |
| 9 | 94.75% | 97.30% |
| 10 | 93.90% | 95.61% |
| 11 | 83.47% | 89.35% |
| 12 | 95.88% | 97.54% |
| 13 | 91.87% | 95.01% |
| 14 | 86.58% | 89.55% |
| 15 | 97.33% | 98.53% |
| Average | 92.17% | 94.68% |

Figure 4:
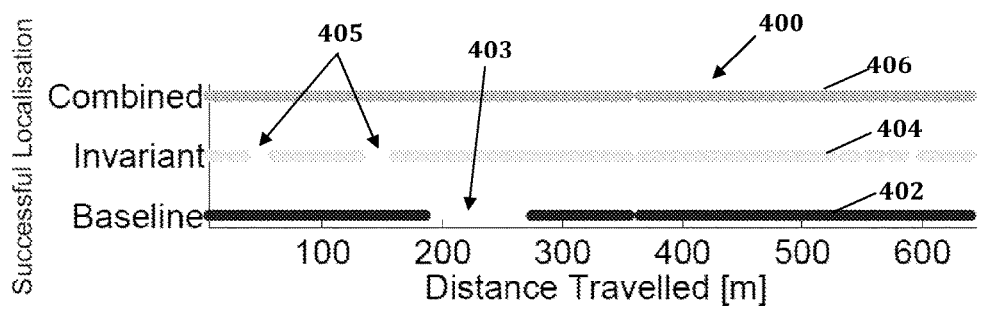
FIG. 4 illustrates the relative performance of embodiments.

FIG. 4 shows the localisation performance of the three systems: baseline system; the invariant system and the combined system. The graph 400 shows successful localisation against distance traveled for the embodiment being described. Line 402 shows the regions in which the baseline system using just images for the recognition process successfully located the vehicle. The Figure highlights that there is a large region 403 at around 190 m to 270 m in which the vehicle was not localised.

Line 404 shows the regions in which the invariant system successfully located the vehicle (ie that using just the transformed images in the VO pipeline). It can be seen that the illumination invariant image recognition process leads to shorter distances traveled without localisation than the RGB image recognition process but there are still regions (eg 405) in which localisation did not occur.

Line 406 shows a plot for the combined system which uses both the un-transformed image pipeline and the transformed image pipeline. It can be seen that the line 406 does not contain any gaps and as such, the combined system was able to localise the vehicle 102 at substantially all points.

Figure 5:
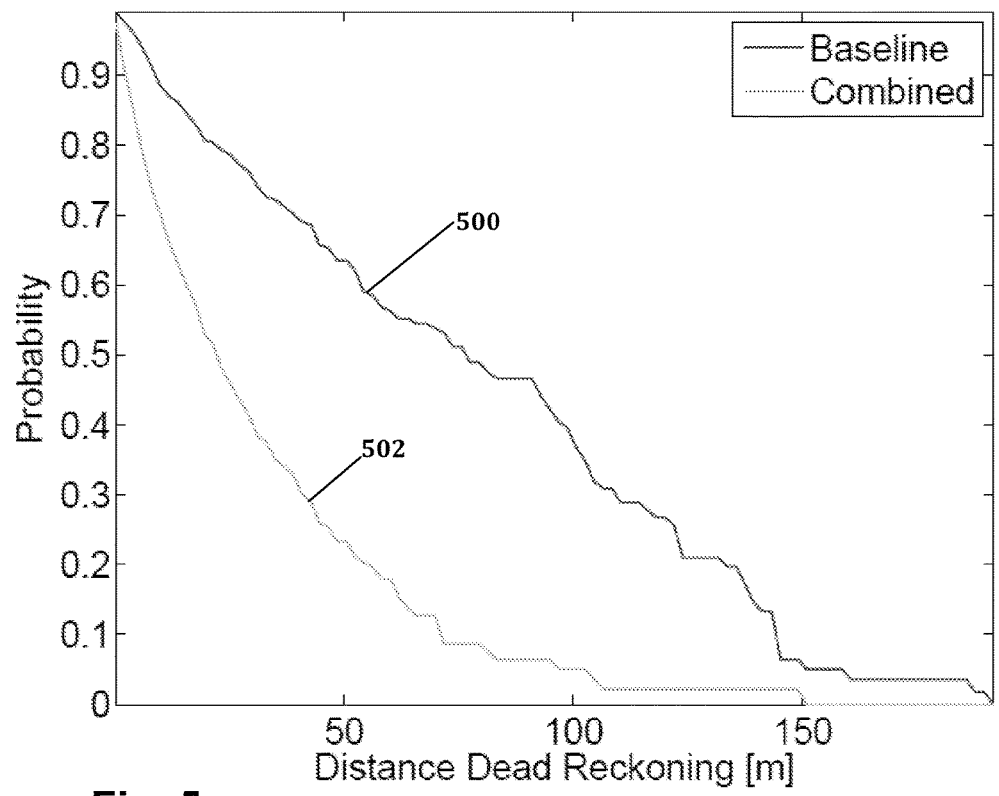
FIG. 5 illustrates the relative performance of two embodiments and highlights the probability of localisation being performed for each of those embodiments.

FIG. 5 shows that the likelihood of the baseline system (500) travelling blind for up to 100 m is close to 40%, whereas with the combined system (502), the likelihood is just 5%. Thus, embodiments which provide the combined system are advantageous in view of their increased robustness and ability to localise the vehicle 102 in difficult lighting conditions as illustrated in FIG. 5.

Figure 6:
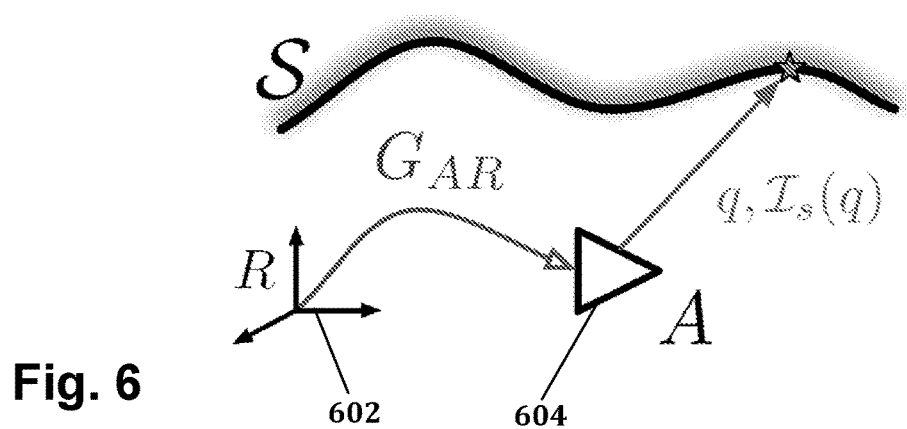
FIG. 6 shows a schematic representation of movement within an environment and is used to illustrate the localisation of a vehicle.

The localisation process referred to above is described in more detail here with reference to FIG. 6.

For a vehicle 102 at position A 604 in the known 3D scene S with local co-ordinate frame R 602, embodiments seek the transform $G_{AR}$ using only a single illuminant invariant image $I_A$ captured at position A 604, as illustrated in FIG. 6. It is assumed that the known 3D scene S consists of a point cloud sampled by a survey vehicle (i.e. is provided by the representation described above), where each point $q \in \mathbb{R}^3$ has an associated prior illumination invariant feature $I_S(q) \in \mathbb{R}^1$ sampled at the time of the survey when the representation was generated.

The appearance $I_A$ of a point q viewed from position A 604 is found by reprojecting q onto the image plane x using the camera projection parameters κ as follows:

$$x_A = \mathcal{P}(q, G_{AR}, \kappa) \qquad (8)$$

To recover the transform $G_{AR}$ it is sought to harmonise the information between the prior appearance $I_S$ and the appearance $I_A$ as viewed from position A 604. An objective function (f) is defined which measures the discrepancy between the visual appearance of the subset of points $S_A$ from position A 604 and the prior appearance of the points $I_S$ as follows:

$$f\left(\overbrace{\mathcal{I}_A(\mathcal{P}(q, G_{AR}, \kappa))}^{\text{Appearance of } S_A \text{ from } A}, \overbrace{\mathcal{I}_A(q)}^{\text{Prior appearance of } S_A} \mid \overbrace{q \in S_A}^{\text{Scene viewed by } A}\right) \qquad (9)$$

$$: \mathbb{R}^{2 \times |S_A|} \mapsto \mathbb{R}^1 \equiv f(\mathcal{I}_A(x_A), \mathcal{I}_S(q) \mid q \in S_A)$$

The Normalised Information Distance (NID) is chosen as the objective function, as it provides a true metric that is robust to local illumination change and occlusions.

Given two discrete random variables {X,Y}, the NID is defined as follows:

$$NID(X, Y) \equiv \frac{H(X, Y) - I(X; Y)}{H(X, Y)} \qquad (10)$$

where H(X,Y) denotes the joint entropy and I(X;Y) denotes the mutual information.

Substituting NID for our objective function from equation 11 yields the following:

$$f \equiv NID(I_A(x_A), I_S(q) \mid q \in S_A) \qquad (11)$$

Thus, it can be seen that the localisation problem is a minimisation of equation 11 as follows:

$$\hat{G}_{AR}: \underset{G_{AR}}{\operatorname{argmin}}\, NID(\mathcal{I}_A(x_A), \mathcal{I}_S(q) \mid q \in S_A) \qquad (12)$$

The initial estimate $\hat{G}_{AR}|0$ can be set to the previous position of the sensor, or can incorporate incremental motion information provided by wheel encoders, visual odometry or another source.

In one embodiment, the minimisation problem of equation 12 above is solved with the quasi-Newton BFGS method discussed in N. Jorge and J. W. Stephen, "*Numerical optimization*", Springerverlang, USA, 1999, implemented in Ceres (S. Agarwal, K. Mierle, and others, "*Ceres solver*", https://code.google.com/p/ceres-solver/) using the analytical derivatives presented in A. D. Stewart and P. Newman, "*Laps-localisation using appearance of prior structure: 6-dof monocular camera localisation using prior point-clouds*", in Robotics and Automation (ICRA), 2012 IEEE International Conference on. IEEE, 2012, pp. 2625-2632 obtained using B-spline interpolation. In one set-up the cost function is implemented in the OpenCL language and solved using an Nvidia GTX Titan GPU, requiring approximately 8 ms per evaluation. Such processing times allow embodiments described herein to be utilised in what may be thought of as real-time. Here real time is intended to mean as the vehicle moves such that the localisation provided by embodiments described herein can be used to establish the position of the vehicle 102.

The invention claimed is:

1. A computerized method of localizing a transportable apparatus within an environment around the apparatus, comprising:
   obtaining a sequence of images of the environment;
   providing the sequence of images of the environment to a Visual Odometry (VO) system comprising processing circuitry comprising:
   a first VO pipeline arranged for:
      performing a first transformation on the sequence of images of the environment, to generate a first sequence of transformed images;
      comparing one or more images from the first sequence of transformed images against a stored representation of the environment so as to determine first corresponding features within the images of the first sequence and the representation;
      providing a first localization estimate for the transportable apparatus according to a position of the one or more first corresponding features; and
      providing a first quality value for the first localization estimate; and
   a second VO pipeline arranged for:
      performing a second transformation on the sequence of images of the environment, to generate a second sequence of transformed images, wherein the second transformation is different from the first transformation;
      comparing one or more images from the second sequence of transformed images against the stored representation of the environment so as to determine second corresponding features within the images of the second sequence and the representation;
      providing a second localization estimate for the transportable apparatus according to a position of the one or more second corresponding features; and
      providing a second quality value for the second localization estimate;
   selecting either the first localization estimate or the second localization estimate based on a comparison of the first and the second quality values; and
   localizing the transportable apparatus according to the selected first or second localization estimate.

2. A method according to claim 1 in which the representation of the environment is provided by one or more sequences of stored images.

3. A method according to claim 2 in which the sequence of stored images undergo transformations in order that at least one of the comparisons be performed.

4. A method according to claim 1 in which the representation of the environment is a 3D model of the environment.

5. A method according to claim 1 in which the sequence of images is obtained using any of the following: an optical camera; a stereoscopic optical camera; and a thermal imaging camera.

6. A method according to claim 1 in which the images within the sequence of images are within an RGB color space.

7. A method according to claim 1 in which the transformation performed on an image transforms the image into one of the following: an illumination invariant color space; or greyscale.

8. An apparatus arranged to perform a localization of itself within an environment, the apparatus comprising:
   a sensor configured to generate a sequence of images of an environment around the apparatus;
   processing circuitry in communication with the sensor, the processing circuitry configured to execute a first Visual Odometry (VO) pipeline and a second VO pipeline:
   the first VO pipeline arranged to:
      perform a first transformation on the sequence of images of the environment, to generate a first sequence of transformed images;
      compare, against a stored representation of the environment, one or more images from the first sequence of transformed images;
      determine, during the comparison, first corresponding features within the images of the first sequence and the stored representation;
      provide a first localization estimate for the apparatus according to a position of the one or more first corresponding features; and
      provide a first quality value for the first localization estimate;
   the second VO pipeline arranged to:
      perform a second transformation on the sequence of images of the environment, to generate a second sequence of transformed images, wherein the second transformation is different from the first transformation;
      compare, against the stored representation of the environment, one or more images from the second sequence of transformed images;
      determine, during the comparison, second corresponding features within the images of the second sequence and the stored representation;
      provide a second localization estimate for the apparatus according to a position of the one or more second corresponding features; and
      provide a second quality value for the second localization estimate;
   the processing circuitry further configured to:
      select either the first localization estimate or the second localization estimate based on a comparison of the first and the second quality values; and
      localize the apparatus according to the selected first or second localization estimate.

9. A non-transitory machine readable medium containing instructions, which when read by a computer, cause that computer to:
   obtain a sequence of images of an environment around an apparatus;
   execute a first Visual Odometry (VO) pipeline and a second VO pipeline;
   the first VO pipeline arranged to:
      perform a first transformation on the sequence of images of the environment, to generate a first sequence of transformed images;
      compare one or more images from the first sequence of transformed images against a stored representation of the environment;
      determine first corresponding features within the images of the first sequence and the stored representation;

provide a first localization estimate for the apparatus according to a position of the one or more first corresponding features; and
provide a first quality value for the first localization estimate;
the second VO pipeline arranged to:
perform a second transformation on the sequence of images of the environment, to generate a second sequence of transformed images, wherein the second transformation is different from the first transformation;
compare, against the stored representation of the environment, one or more images from the second sequence of transformed images;
determine second corresponding features within the images of the second sequence and the stored representation;
provide a second localization estimate for the apparatus according to a position of the one or more second corresponding features; and
provide a second quality value for the second localization estimate;
select either the first localization estimate or the second localization estimate based on a comparison of the first and the second quality values; and
localize the apparatus according to the selected first or second localization estimate.

10. A method according to claim 4 in which the 3D model of the environment comprises a 3D point cloud.

11. A method according to claim 1, in which the first transformation is a null transformation such that the first sequence of transformed images is the obtained sequence of images of the environment.

12. A method according to claim 1, in which the first and the second VO pipelines run in parallel.

13. A method according to claim 1, in which the first quality value or the second quality value is assessed:
based on a number of the first or second corresponding features matched, respectively, or
based on associated certainties of matches of the first or second corresponding features, respectively, that are determined to be correct.

14. An apparatus according to claim 8, in which the first transformation is a null transformation such that the first sequence of transformed images is the obtained sequence of images of the environment.

15. An apparatus according to claim 8, in which the first and the second VO pipelines are executed in parallel.

16. An apparatus according to claim 8, in which the first quality value or the second quality value is assessed:
based on a number of the first or second corresponding features matched, respectively, or
based on associated certainties of matches of the first or second corresponding features, respectively, that are determined to be correct.

17. A non-transitory machine readable medium according to claim 9, in which the first transformation is a null transformation such that the first sequence of transformed images is the obtained sequence of images of the environment.

18. A non-transitory machine readable medium according to claim 9, in which the first and the second VO pipelines are executed in parallel.

19. A non-transitory machine readable medium according to claim 9, in which the first quality value or the second quality value is assessed:
based on a number of the first or second corresponding features matched, respectively, or
based on associated certainties of matches of the first or second corresponding features, respectively, that are determined to be correct.

* * * * *